(12) United States Patent
Frey

(10) Patent No.: US 9,372,276 B2
(45) Date of Patent: Jun. 21, 2016

(54) COMBINATIONS OF AXIAL AND SADDLE COILS TO CREATE THE EQUIVALENT OF TILTED COILS FOR DIRECTIONAL RESISTIVITY MEASUREMENTS

(75) Inventor: Mark T. Frey, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 554 days.

(21) Appl. No.: 13/118,913

(22) Filed: May 31, 2011

(65) Prior Publication Data

US 2012/0081122 A1 Apr. 5, 2012

Related U.S. Application Data

(60) Provisional application No. 61/353,587, filed on Jun. 10, 2010.

(51) Int. Cl.
*G01V 3/30* (2006.01)
*G01V 3/28* (2006.01)

(52) U.S. Cl.
CPC ........................................ *G01V 3/28* (2013.01)

(58) Field of Classification Search
CPC .. G01R 1/18; G01R 33/383; G01R 33/34007; G01R 33/34069
USPC .............................. 367/1–86; 166/244.1–403, 166/250.01–250.17; 73/152.01–152.62; 702/1–199; 324/323–375; 343/703, 343/709, 718–719; 175/1, 40–50; 250/253–266
See application file for complete search history.

(56) References Cited

U.S. PATENT DOCUMENTS

| | | | |
|---|---|---|---|
| 5,235,285 A | 8/1993 | Clark et al. | |
| 5,517,464 A | 5/1996 | Lerner et al. | |
| 5,594,343 A | 1/1997 | Clark et al. | |
| 5,854,991 A | 12/1998 | Gupta et al. | |
| 6,163,155 A | 12/2000 | Bittar | |
| 6,476,609 B1 | 11/2002 | Bittar | |
| 6,556,015 B1 | 4/2003 | Omeragic et al. | |
| 6,641,434 B2 | 11/2003 | Boyle et al. | |
| 6,690,170 B2 | 2/2004 | Homan et al. | |
| 6,911,824 B2 | 6/2005 | Bittar | |
| 6,930,652 B2 | 8/2005 | Smith et al. | |
| 6,969,994 B2 | 11/2005 | Minerbo et al. | |
| 6,998,844 B2 | 2/2006 | Omeragic et al. | |
| 7,038,457 B2 | 5/2006 | Chen et al. | |
| 7,212,173 B2 | 5/2007 | Chen et al | |
| 7,382,135 B2 | 6/2008 | Li et al. | |
| 7,414,391 B2 * | 8/2008 | Homan et al. | 324/202 |
| 7,483,793 B2 | 1/2009 | Wang et al. | |
| 7,825,664 B2 * | 11/2010 | Homan et al. | 324/334 |
| 8,087,476 B2 * | 1/2012 | Wassell et al. | 175/40 |
| 8,368,403 B2 | 2/2013 | Homan et al. | |
| 2004/0183538 A1 * | 9/2004 | Hanstein | G01V 3/28 324/339 |

* cited by examiner

*Primary Examiner* — Tung X Nguyen
*Assistant Examiner* — Alesa Allgood
(74) *Attorney, Agent, or Firm* — John Vereb

(57) ABSTRACT

An electromagnetic well logging instrument includes an instrument housing, at least one transmitter coil disposed on the housing and at least one receiver coil disposed on the housing. At least one of the transmitter and receiver coils is formed from a combination solenoidal (axial) and saddle coils. The net dipole moment direction of the combined coil is determined by selecting the relative turn-areas of the saddle and solenoidal coil. The combined coil can be formed from a single wire wound to have both a longitudinal magnetic dipole moment and a transverse magnetic dipole moment with respect to a longitudinal axis of the housing.

7 Claims, 4 Drawing Sheets

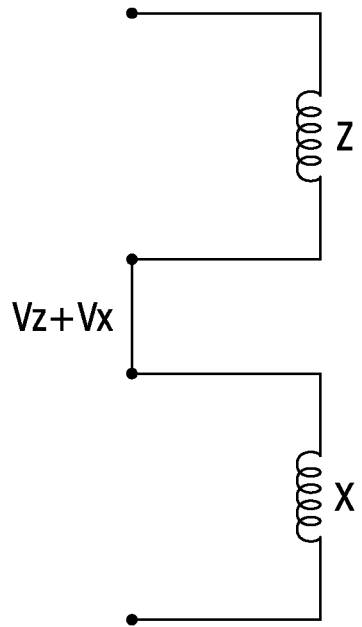
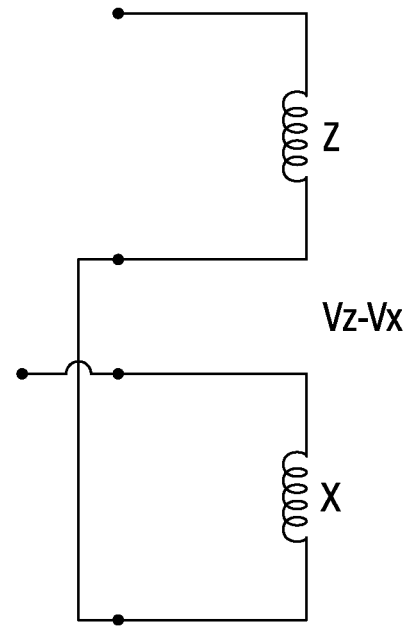
FIG. 3
FIG. 4
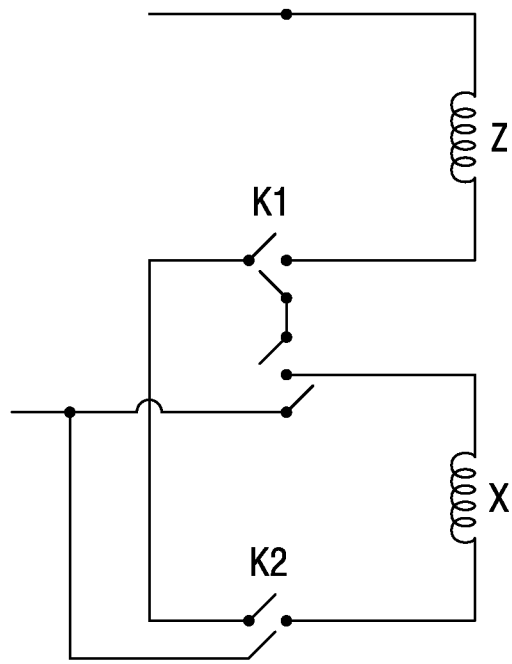
FIG. 5

COMBINATIONS OF AXIAL AND SADDLE COILS TO CREATE THE EQUIVALENT OF TILTED COILS FOR DIRECTIONAL RESISTIVITY MEASUREMENTS

CROSS-REFERENCE TO RELATED APPLICATIONS

Priority is claimed from U.S. Provisional Application No. 61/353,587 filed on Jun. 10, 2010

STATEMENT REGARDING FEDERALLY SPONSORED RESEARCH OR DEVELOPMENT

Not applicable.

BACKGROUND

The invention relates generally to the field of electromagnetic surveying of subsurface formations from within a wellbore. More specifically, the invention relates to structures for antennas for wellbore electromagnetic surveying that have azimuthally variant sensitivity.

U.S. Pat. No. 6,969,994 issued to Minerbo et al. and assigned to the assignee of the present invention describes one example of a well logging instrument including both longitudinal magnetic dipole and tilted magnetic dipole antennas so that, among other functions, distances between a wellbore and a formation boundary can be estimated in the presence of anisotropy and relative dip (angle between the wellbore axis and the direction of layering of the subsurface formations.

Tilted magnetic dipole antennas can take up a substantial length along the drill collar on which they are mounted, particularly if the collar is a relatively large diameter. It is known in the art to use collocated saddle coils and longitudinal magnetic dipole antennas to achieve tilted magnetic dipoles, however, such use requires combining signals from the separate coils. One disadvantage of a connecting two separate coils, in series particularly, is that relative phase and gain changes between the coils can be significant. Such changes are typically not compensated for when making both upward and downward measurements.

There exists a need for an antenna coil structure for electromagnetic well logging that can provide a selected magnetic dipole moment orientation without the need to connect separate coils or to use tilted coils to provide a selected oblique dipole moment direction.

SUMMARY OF THE INVENTION

One aspect of the invention is an electromagnetic well logging instrument including an instrument housing, at least one transmitter coil disposed on the housing; and at least one receiver coil disposed on the housing. At least one of the transmitter and receiver coils is formed from a combination solenoid (axial) and saddle coils. The net dipole moment direction of the combined coil is determined by selecting the relative turn-areas of the saddle and solenoid coil. The combined coil is formed from a single wire wound to have both a longitudinal magnetic dipole moment and at least one transverse magnetic dipole moment with respect to a longitudinal axis of the instrument housing.

In a different example, separate solenoid and saddle coils can be connected together in series to form a combined coil with a tilted dipole moment.

Another aspect of the invention is a method for calibrating antenna and electronic circuit phase and gain errors in an example of the foregoing logging instrument. The saddle and solenoid coils are connected through a switch to enable forward and reverse polarity connection to each other. Taking the ratio of the voltages measured in the forward and reverse polarity connections cancels electronic gain and phase errors. Relative gain and phase errors between the saddle and solenoid coil antennas can be calibrated by applying a calibrator coil to an exterior of the instrument at a selected oblique angle and measuring voltages in at least one receiver coil when a transmitter coil is actuated.

Other aspects and advantages of the invention will be apparent from the description and claims which follow.

BRIEF DESCRIPTION OF THE DRAWINGS

FIG. 3 shows example wiring of the combined solenoid and saddle coil to make measurements in one direction.

FIG. 4 shows example wiring of the combined solenoid and saddle coil to make measurements in a direction opposed to the direction of the coil in FIG. 3.

FIG. 5 shows example switching circuits to enable the coil of FIG. 2A to make measurements in either direction.

DETAILED DESCRIPTION

Figure 1:
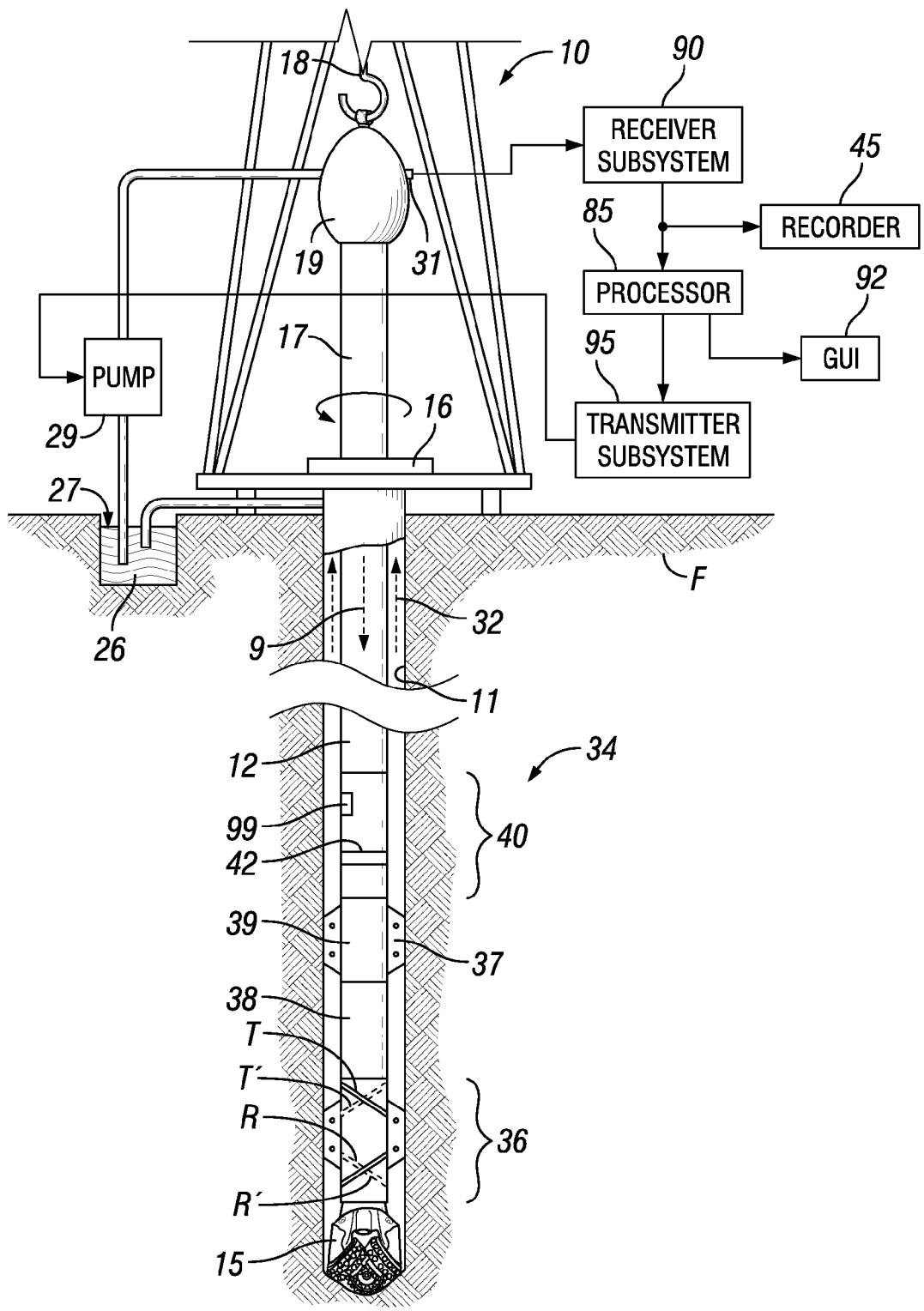
FIG. 1 shows an example electromagnetic well logging while drilling system using tilted antennas.

FIG. 1 illustrates a conventional drilling rig and a drill string in which an instrument for performing a method according to the present invention can be used. A land-based platform and derrick assembly 10 are shown positioned over a wellbore 11 penetrating a subsurface rock formation F. In the illustrated example, the wellbore 11 is formed by rotary drilling in a manner that is well known. Those of ordinary skill in the art given the benefit of this disclosure will appreciate, however, that the present invention also finds application in directional drilling, for example, using rotary steerable directional drilling systems or "steerable" hydraulic motors. Further, the invention is not limited to land-based drilling but is equally applicable in marine wellbore drilling.

A drill string 12 is suspended within the wellbore 11 and includes a drill bit 15 at its lower end. The drill string 12 can be rotated by a rotary table 16, energized by means (not shown) which engages a kelly 17 at the upper end of the drill string 12. The drill string 12 is suspended from a hook 18, attached to a traveling block (also not shown), through the kelly 17 and a rotary swivel 19 which permits rotation of the drill string 12 relative to the hook 18.

Drilling fluid or mud 26 is stored in a pit 27 formed at the well site or a tank. A pump 29 delivers the drilling fluid 26 to the interior of the drill string 12 via a port in the swivel 19, inducing the drilling fluid to flow downwardly through the drill string 12 as indicated by the directional arrow 9. The drilling fluid 26 exits the drill string 12 via jets or courses (not shown) in the drill bit 15, and then circulates upwardly through the annular space between the outside of the drill string 12 and the wall of the wellbore 11, (called the "annulus"), as indicated by the direction arrows 32. In this manner, the drilling fluid 26 cools and lubricates the drill bit 15 and carries formation cuttings up to the surface as it is returned to the pit 27 for recirculation.

The drill string 12 further includes a bottom hole assembly, generally shown at 34, near the drill bit 15 (in other words, within several drill collar lengths from the drill bit). The bottom hole assembly 34 includes instruments in the interior of drill collars or similar tubular devices in the drill string 12 having capability for measuring, processing, and storing information, as well as communicating information to and receiving information from the surface. The bottom hole assembly ("BHA") 34 thus may include, among other devices, a measuring and local communications apparatus 36 for determining and communicating resistivity of the formation F surrounding the wellbore 11. The measuring device and local communications apparatus 36, also known as a "resistivity tool", includes a first pair of transmitting/receiving antennas T, R, as well as a second pair of transmitting/receiving antennas T'', R''. The second pair of antennas T'', R'' are symmetric with respect to the first pair of antennas T, R. The resistivity tool 36 further includes a controller (not shown separately) to control the acquisition of data, as is known in the art. As will be explained below in more detail, the invention contemplates using combination transverse and longitudinal magnetic dipole antennas each combined in a single coil to reproduce the functionality of the tilted antennas T, R, T'', R'' shown in FIG. 1. The resistivity tool 36 includes circuits (not shown separately) for energizing one or more transmitters and detecting voltages imparted into one or more receivers to infer certain properties of the formations F. One non-limiting example of suitable circuitry is described in U.S. Pat. No. 5,594,343 issued to Clark et al., assigned to the assignee of the present invention and incorporated herein by reference.

The BHA 34 may further include instruments housed within certain drill collars 38, 39 for performing various other measurement functions, including, without limitation, BHA orientation for well trajectory navigation, measurement of natural gamma-ray radiation, and formation porosity. A surface/local communications subassembly 40 may also be included in the BHA 34, just above one of the drill collars shown at 39. The subassembly 40 may include a toroidal antenna 42 used for local communication with the resistivity tool 36 (although other known local-communication means may be used in other examples), and a known type of acoustic telemetry system that communicates with a similar system (not shown) at the earth's surface via signals carried in the drilling fluid or mud. Thus, the telemetry system in the subassembly 40 may include an acoustic transmitter that generates an acoustic signal in the drilling fluid (a.k.a., "mud-pulse") that is representative of selected parameters measured by the resistivity tool 36 and/or other instruments 38, 39.

The generated acoustical signal may received at the surface by pressure transducers represented by reference numeral 31. The transducers, for example, piezoelectric transducers, convert the received acoustical signals to electrical signals. The output of the transducers 31 may be coupled to a surface receiving subsystem 90, which demodulates the signals detected by the transducers 31. The output of the receiving subsystem 90 may then be coupled to a computer processor 85 and a recorder 45. The computer processor 85 may be used to determine a formation resistivity profile (among other things) on a "real time" basis, that is, while drilling and contemporaneous well logging measurement is underway, or subsequently by accessing recorded data from the recorder 45. The computer processor 85 can be coupled to a monitor 92 that uses a graphical user interface ("GUI") through which the measured downhole parameters and particular results derived therefrom (e.g., resistivity profiles) are graphically presented to a user.

A surface transmitting system 95 may also be provided for receiving input commands and data from the user (e.g., via the GUI in monitor 92), and is operative to, for example, selectively interrupt the operation of the pump 29 in a manner that is detectable by transducers 99 in the subassembly 40. In this manner, there is two-way communication between the subassembly 40 and the surface equipment. A suitable subassembly 40 is described in greater detail in U.S. Pat. Nos. 5,235,285 and 5,517,464, both of which are assigned to the assignee of the present invention and incorporated herein by reference. Those skilled in the art will appreciate that alternative acoustic techniques, as well as other telemetry means (e.g., electromechanical, electromagnetic), can be used for communication between the surface and the subassembly 40. Other signal communication, such as having the drill string include a "wired" signal communication channel are also within the scope of the present invention. One such communication channel is described in U.S. Pat. No. 6,641,434 issued to Boyle et al., assigned to the assignee of the present invention and incorporated herein by reference.

The resistivity tool shown in and explained above with reference to FIG. 1 makes resistivity measurements that are dependent on the rotational (azimuthal) orientation of the tool with respect to the formations F. The manner of making such azimuthally dependent resistivity measurements is more fully described in U.S. Pat. No. 7,382,135 issued to Li et al., assigned to the assignee of the present invention and incorporated herein by reference. As described in the Li et al. '135 patent, the method of making azimuthally sensitive measurements finds particular application in determining distance to a formation boundary, or a resistivity contrast within a particular formation, e.g., a gas/water or oil/water contact.

The above description of an example implementation of the invention is made in terms of a logging while drilling (LWD), however, it should be clearly understood that the present invention is applicable to any type of well logging instrument conveyance known in the art, including without limitation, wireline (armored electrical cable), coiled tubing, jointed tubing and/or slickline.

Figure 2:
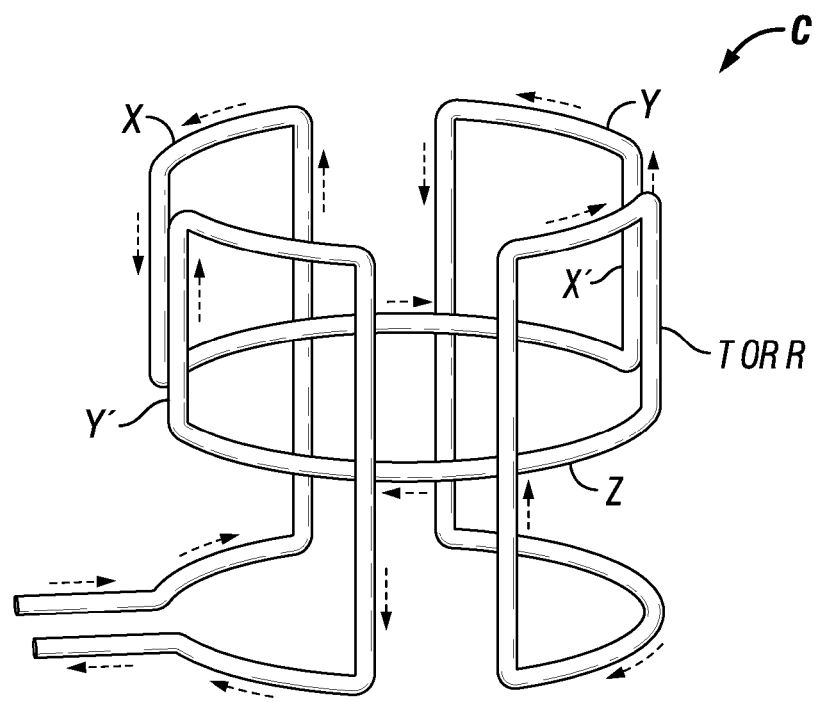
FIG. 2 shows an example combined saddle and longitudinal coil wound from a single wire.

FIG. 2 shows an example of a combined longitudinal magnetic dipole ("axial") and transverse magnetic dipole antenna coil C with orthogonal saddle coils, all wound from a single wire. The coil C may be used as a transmitter T or a receiver R in substitution of the tilted coil transmitters and receivers shown in the resistivity instrument (36 in FIG. 1). The combined coil C may include an axial section Z, and two orthogonal transverse dipole sections, X-X' and Y-Y'. A possible advantage of making a coil C in such fashion is to reduce the effects of relative gain factor between the various sections of the combined antenna coil C. The overall direction of the dipole moment of the coil C can be selected by appropriate selection of the length of the transverse sections X-X', Y-Y' with respect to the diameter of the axial section Z.

Figure 2A:
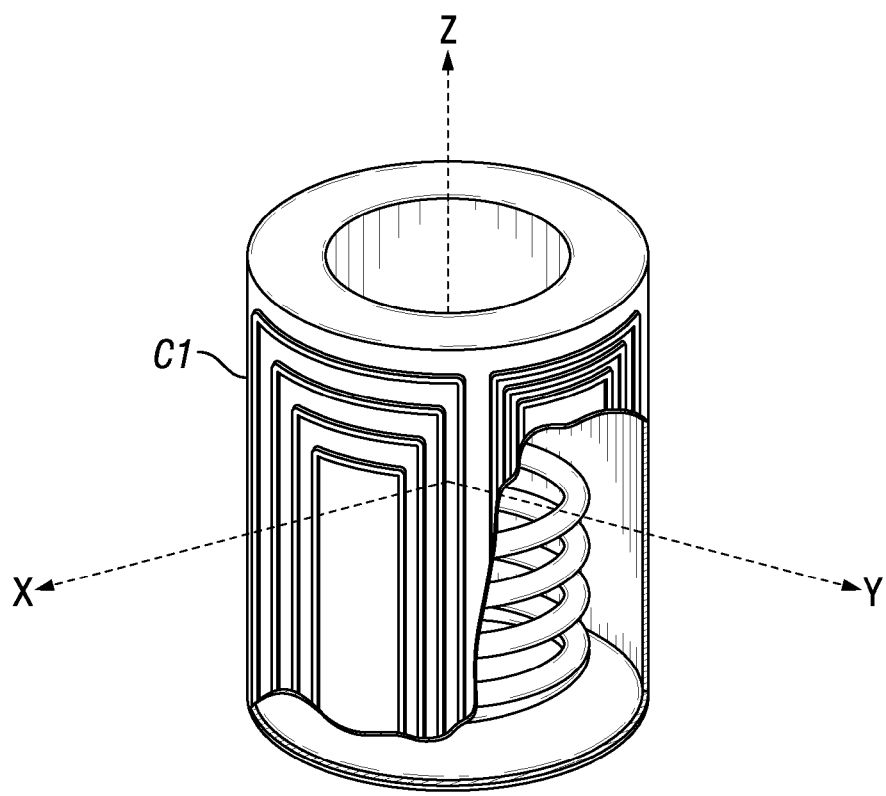
FIG. 2A shows collocated solenoid and saddle coils having transverse dipole moment and a longitudinal (axial) dipole moment.

FIG. 2A shows a collocated triaxial coil including separate transverse dipole saddle coils X, Y and a longitudinal (axial) coil Z. The magnetic dipole moment of the transverse coils and the axial coil will depend on the dimensions of the respective coils and the number of turns in each respective coil. The up-down phase shift and attenuation electromagnetic measurements made by the instrument shown in FIG. 1 rely on rotating the instrument, and thus the tilted antennas. In coil tubing drilling or in wireline operations, in general, the well logging instrument does not rotate. Using coils such as shown at C1 in FIG. 2A it is possible to connect two separate coils together with switches such that the transverse saddle coil moment is inverted to make the equivalent of an up/down phase shift and attenuation measurement without the need for tool rotation. Possible combinations of two coils are shown in FIG. 3, where the polarity of the axial section and the transverse sections are aligned, and in FIG. 4, where they are reversed. In general two such coils that each have non-aligned transverse moments are required because the instrument's transverse antenna(s) moment(s) are typically not aligned with formation layering. For example, consider the case of an instrument with an axial transmitter moment and two collocated receiver coils such at that described above with reference to FIG. 2A. Let V1$u$ be the voltage measured on one of the receiver coils when the saddle coil is connected to the axial coil in the forward direction and V1$d$ be the voltage measured with the reverse connection. Similarly, let V2$u$ and V2$d$ be the voltage measured on a second collocated receiver coil that has a transverse moment perpendicular to that of the first receiver coil. Each of these voltages can be expressed in terms of axial and transverse couplings that would be measured if the instrument were aligned with formation layering consisting of parallel layers or "beds":

$$V1u = g1[V_{zz} + V_{zx}\cos(\phi)]$$

$$V1d = g1[V_{zz} - V_{zx}\cos(\phi)]$$

$$V2u = g2[V_{zz} - V_{zx}\sin(\phi)]$$

$$V2d = g2[V_{zz} - V_{zx}\sin(\phi)]$$

where g1 and g2 are the overall (complex) gain factors and $\phi$ is the angle between the antennas' transverse component and the direction perpendicular to the formation bedding layers. Taking the ratio of the voltages measured with the forward and reverse connection for each receiver cancels the gain factors:

$$R1 = \frac{V_{zz} + V_{zx}\cos(\varphi)}{V_{zz} - V_{zx}\cos(\varphi)} \quad (1)$$

$$R2 = \frac{V_{zz} + V_{zx}\sin(\varphi)}{V_{zz} - V_{zx}\sin(\varphi)}. \quad (2)$$

From the foregoing relationships the angle and the voltage corresponding to an up-down measurement with respect to the bedding planes can be calculated using the following expressions:

$$\varphi = \tan^{-1}\left[\left(\frac{R2-1}{R2+1}\right)\left(\frac{R1-1}{R1+1}\right)\right] \quad (3)$$

$$\gamma = \frac{V_{zx}}{V_{zz}} = \sqrt{\left(\frac{R1-1}{R1+1}\right)^2 + \left(\frac{R2-1}{R2+1}\right)^2} \quad (4)$$

$$V_{up-down} = \frac{1+\gamma}{1-\gamma} \quad (5)$$

Figure 6:
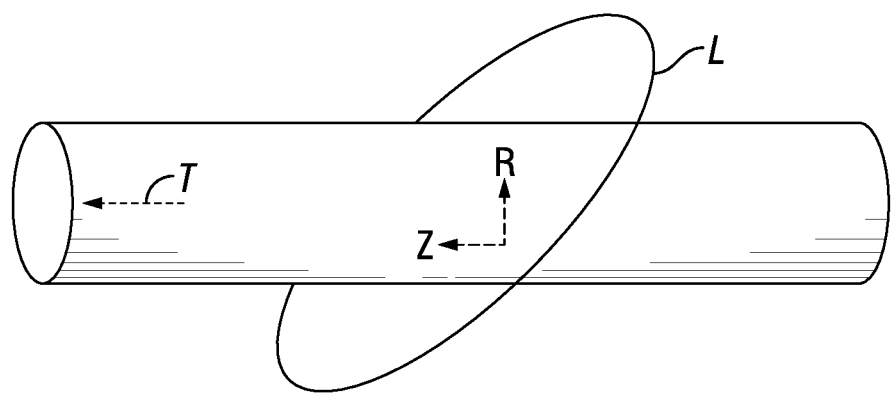
FIG. 6 shows one part of a calibration procedure to compensate relative gain and phase between transverse and longitudinal dipole antennas.
Figure 7:
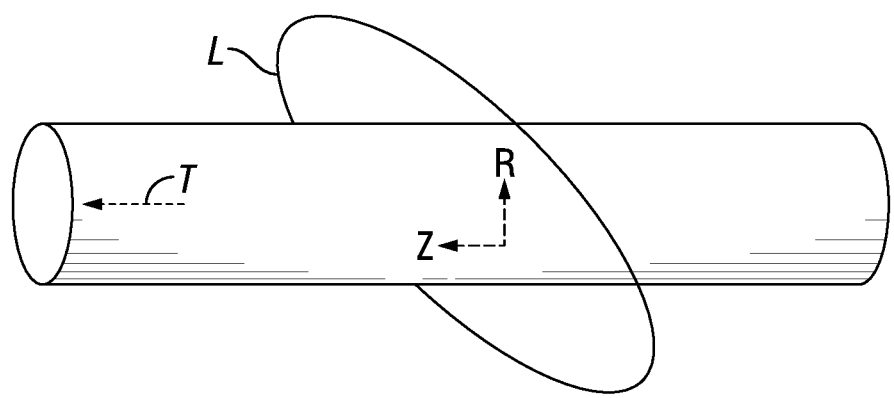
FIG. 7 shows the other part of the calibration procedure of FIG. 6.
Figure 8:
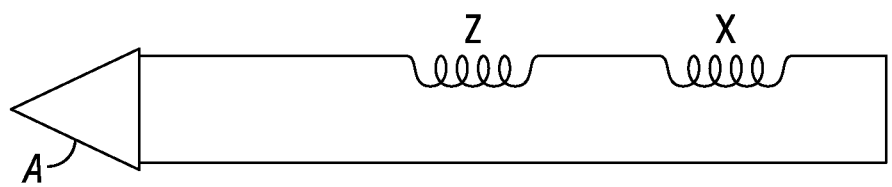
FIG. 8 shows the equivalent circuit for longitudinal and transverse dipole antennas connected in series.

FIG. 5 shows a combination of switches, K1 and K2 that may be arranged to invert the polarity of the transverse (saddle, X or Y) section of the coils C1. The switches could, for example, be analog (FET-based) switches if the antennas are receivers or relays if the coils are transmitters. In the example shown in FIG. 5, the impedance of the switches and connecting wires that connect the coils in series can generate a relative gain error between the coils. This relative gain error can be determined and removed using a procedure shown in FIG. 6 and FIG. 7. First, in FIG. 6, a loop L with well defined geometry is applied to the exterior of the instrument in one oblique direction (usually 45 degrees from the instrument axis). Measurements of the output of the receiver coils is measured. Then, in FIG. 7, the orientation of the loop L is reversed (180 degrees) and the measurements are repeated. FIG. 8 shows the combined inputs of the axial Z and transverse X coil components in the input of an amplifier A. In using the technique explained above with reference to FIGS. 6 and 7, the following analysis may apply.

The ratio of the value of the signal measured with the loop L in the first position with respect to the signal measured with the loop L in the second position may be represented by ε. Voltages measured at the respective X and Z components are shown by V with corresponding subscript.

$$\varepsilon = \frac{-V_x + \alpha V_z}{V_x + \alpha V_z} \quad (6)$$

in which α represents the relative gain and phase difference between the X and Z antenna components. Solving for α from Eq. (6) provides the following expression:

$$\alpha = \frac{V_x(1+\varepsilon)}{V_z(1+\varepsilon)} \quad (7)$$

The ratio Vx/Vz or its components can be determined by modeling the response of the transmitter/receiver system. Although only the X transverse coil is described above, the principles are equally applicable to the Y transverse coil.

When mounting any of the foregoing antenna structures on the exterior of the drill collar or other instrument housing, a shield that is essentially transparent to electromagnetic energy emitted or received from any direction may be used. Several examples of such shields are described in U.S. Patent Application Publication No. 2010/0277176 filed by Homan et al. and incorporated herein by reference.

A well logging instrument and calibration method made according to the various aspects of the invention may enable making the equivalent of tilted dipole measurements without the need to rotate the well logging instrument.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic well logging instrument, comprising:
   an instrument housing;
   an antenna disposed on the housing, wherein the antenna comprises at least one saddle coil having first and second terminals and an axial coil having first and second terminals, wherein the saddle coil and axial coil are collocated and have respective dipole moments that are orthogonal with respect to one another, and wherein the first terminal of the axial coil and the first terminal of the at least one saddle coil have a first polarity and the second terminal of the axial coil the second terminal of the at least one saddle coil have a second polarity, the first and second polarities being opposite from each other; and an arrangement of switching devices that electronically connects the axial coil to the saddle coil, wherein the arrangement of switching devices is configured such that a first set of switches of the switching devices is operable to electronically couple the second terminal of the axial coil to the first terminal of the at least one saddle coil and a second set of switches of the switching devices is operable to electronically couple the second terminal of the axial coil to the second terminal of the at least one saddle coil;

wherein the overall dipole moment of the antenna is an oblique dipole moment in a first direction when the second terminal of the axial coil and the first terminal of the at least one saddle coil are electronically coupled by the first set of switches and is the oblique dipole moment in a second direction when the second terminal of the axial coil and the second terminal of the at least one saddle coil are electronically coupled by the second set of switches, the first and second directions being opposite from each other.

2. The electromagnetic well logging instrument of claim 1 wherein the at least one saddle coil and comprises two orthogonal saddle coils.

3. The electromagnetic well logging instrument of claim 1, wherein the electronic well logging instrument is configured to make symmetric and anti-symmetric measurements, wherein a symmetric measurement is made by operating the first set of switches to electronically couple the second terminal of the axial coil to the first terminal of the at least one saddle coil, and wherein an anti-symmetric measurement is made by operating the second set of switches to electronically couple the second terminal of the axial coil to the second terminal of the at least one saddle coil.

4. The electromagnetic well logging instrument of claim 1, wherein operation of arrangement of switching devices to change the electronically coupling the second terminal of the axial coil from the first terminal of the at least one saddle coil to the second terminal of the at least saddle coil reverses the polarity of the at least one saddle coil with respect to the axial coil.

5. The electromagnetic well logging instrument of claim 1, wherein the first polarity is positive and the second polarity is negative.

6. A method for calibrating gain and phase differences in an electromagnetic well logging instrument, comprising: an instrument housing and a transmitter antenna and a receiver antenna disposed on the housing, wherein at least one of the transmitter or receiver antennas is wound from a single continuous wire forming an axial section, a first transverse section, and a second transverse section, wherein the axial section electronically connects the first transverse section to the second transverse section, and wherein an overall direction of a dipole moment is dependent upon a length of the first and second transverse sections and a diameter of the axial section, the method comprising:

applying a calibrator coil to an exterior of the instrument at a selected oblique angle;

obtaining a first voltage measurement in the receiver antenna of the electromagnetic well logging tool when the transmitter antenna is energized;

reversing the orientation of the calibrator coil;

obtaining a second voltage measurement in the receiver antenna of the electromagnetic well logging tool when the transmitter antenna is energized; and determining a gain and phase error of the two connected coils from the first and second voltage measurements.

7. A method for canceling gain and phase differences in an electromagnetic well logging instrument, comprising: an instrument housing, a transmitter antenna and a receiver antenna disposed on the housing, wherein at least one of the transmitter antenna or receiver antenna comprises at least one saddle coil having first and second terminals and an axial coil having first and second terminals, wherein the saddle coil and axial coil are collocated and have respective dipole moments that are orthogonal with respect to one another, and wherein the first terminal of the axial coil and the first terminal of the at least one saddle coil have a first polarity and the second terminal of the axial coil the second terminal of the at least one saddle coil have a second polarity, the first and second polarities being opposite from each other, an arrangement of switching devices that electronically connects the axial coil to the saddle coil, wherein the arrangement of switching devices is configured such that a first set of switches of the switching devices is operable to electronically couple the second terminal of the axial coil to the first terminal of the at least one saddle coil and a second set of switches of the switching devices is operable to electronically couple the second terminal of the axial coil to the second terminal of the at least one saddle coil, wherein the overall dipole moment of the antenna is an oblique dipole moment in a first direction when the second terminal of the axial coil and the first terminal of the at least one saddle coil are electronically coupled by the first set of switches and is the oblique dipole moment in a second direction when the second terminal of the axial coil and the second terminal of the at least one saddle coil are electronically coupled by the second set of switches, the first and second directions being opposite from each other, wherein operation of arrangement of switching devices to change the electronically coupling the second terminal of the axial coil from the first terminal of the at least one saddle coil to the second terminal of the at least saddle coil reverses the polarity of the at least one saddle coil with respect to the axial coil, the method comprising:

measuring a first voltage in the receiver antenna when the transmitter antenna is energized;

reversing the polarity of the at least one saddle coil with respect to the axial coil;

repeating measuring the voltages measuring a second voltage in the receiver antenna when the transmitter antenna is energized; and taking the ratio of the first and second measured voltages.

* * * * *